United States Patent
Baba

(10) Patent No.: US 10,095,455 B2
(45) Date of Patent: Oct. 9, 2018

(54) MONITORING APPARATUS, CONTROL METHOD, AND STORAGE MEDIUM

(71) Applicant: CANON KABUSHIKI KAISHA, Tokyo (JP)

(72) Inventor: Shohei Baba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/654,298

(22) Filed: Jul. 19, 2017

(65) Prior Publication Data

US 2018/0024794 A1    Jan. 25, 2018

(30) Foreign Application Priority Data

Jul. 22, 2016 (JP) .................................. 2016-144514

(51) Int. Cl.
G06F 3/12 (2006.01)

(52) U.S. Cl.
CPC .......... *G06F 3/1273* (2013.01); *G06F 3/1203* (2013.01); *G06F 3/1259* (2013.01); *G06F 3/1288* (2013.01)

(58) Field of Classification Search
USPC ................................................. 358/1.1–3.29
See application file for complete search history.

(56) References Cited

U.S. PATENT DOCUMENTS

| 7,970,780 | B2* | 6/2011 | Hirahara | G06Q 10/06 358/1.14 |
| 2010/0182624 | A1* | 7/2010 | Murakami | G06F 3/1204 358/1.9 |
| 2013/0107322 | A1* | 5/2013 | Tonami | G06F 3/1296 358/1.15 |
| 2016/0054964 | A1* | 2/2016 | Takagi | G06F 3/1273 358/1.15 |

FOREIGN PATENT DOCUMENTS

JP    2014-044577 A    3/2014

* cited by examiner

*Primary Examiner* — Marcellus Augustin
(74) *Attorney, Agent, or Firm* — Canon U.S.A., Inc. IP Division

(57) ABSTRACT

A monitoring apparatus is capable of communicating with an image forming apparatus which stores job logs. A first request is made for acquiring job logs from the image forming apparatus and, if a predetermined condition is satisfied, a second request is made for acquiring, one at a time from the image forming apparatus, the job logs which are acquisition targets of the first request. The second request is not made if the number of job logs acquired by the first request coincides with the number of job logs which are acquisition targets of the first request. The second request is made for acquiring the job logs one at a time which are acquisition targets of the first request if the number of job logs acquired by the first request is smaller than the number of job logs which are acquisition targets of the first request.

9 Claims, 4 Drawing Sheets

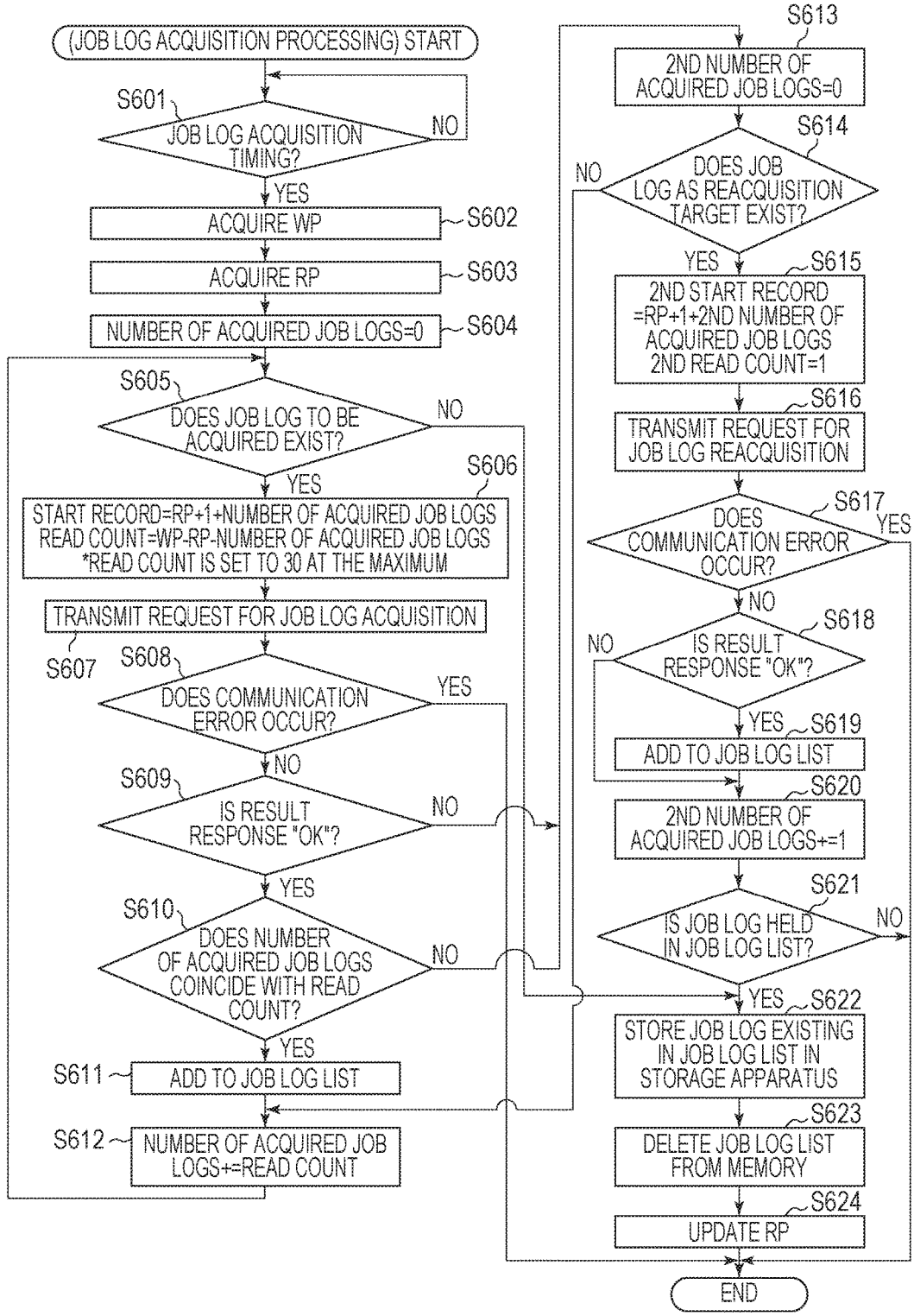

MONITORING APPARATUS, CONTROL METHOD, AND STORAGE MEDIUM

BACKGROUND

Field of the Disclosure

The present disclosure relates to a monitoring apparatus which acquires job logs from an image forming apparatus, a control method, and a storage medium.

Description of the Related Art

Technologies for monitoring image forming apparatuses on a network and acquiring and managing execution history data of jobs, such as printing (hereinafter, referred to as "job logs"), with a monitoring apparatus have been proposed. Upon acquisition of job logs from image forming apparatuses, a monitoring apparatus typically acquires a plurality of job logs for each request in consideration of processing load, etc., of the monitoring apparatus.

Japanese Patent Laid-Open No. 2014-044577 describes that a management server requests image forming apparatuses to transmit job logs depending on the statuses of the image forming apparatuses of monitoring target and collects job logs.

However, there are cases where, when one request for acquiring a plurality of job logs is issued, the number of job logs actually acquired by the monitoring apparatus is smaller than the requested number of job logs. In these cases, since the image forming apparatuses have transmitted some of the job logs, information indicating success of the processing ("OK") may be returned from the image forming apparatuses as a response of a processing result to the request. Then, no recovery processing (a re-request of job log information) is performed by the monitoring apparatus, and acquisition of job logs may be failed.

In the technology described in Japanese Patent Laid-Open No. 2014-044577, since the management server does not perform recovery processing upon failure of acquisition of job log information, there is a possibility that the acquisition of job logs may be failed.

Further, depending on specifications of the image forming apparatuses, even if transmission statuses of the job logs from the image forming apparatuses to the monitoring apparatus are the same, the responses of the processing results to the request to the monitoring apparatus may be different. For example, with respect to a plurality of requested job logs, some image forming apparatuses return "OK" if at least one job log can be transmitted to the monitoring apparatus therefrom, and others return "NG" if at least one of the requested job logs cannot be transmitted. The latter ones return "OK" as a response of the processing result to the request to the monitoring apparatus when all of the plurality of requested job logs is transmitted. That is, even if the response is "OK," recovery processing may be needed in some of the image forming apparatuses.

SUMMARY

The present disclosure provides a mechanism for making a request to reacquire job logs in accordance with conditions without depending only on the above-described responses from image forming apparatuses.

An aspect of the present disclosure is a monitoring apparatus capable of communicating with an image forming apparatus which stores job logs which are history information of jobs, in which a first request is made for acquiring one or more job logs from the image forming apparatus and, after the first request, if a predetermined condition is satisfied, a second request is made for acquiring, one at a time from the image forming apparatus, the job logs which are acquisition targets of the first request. The second request is not made if the number of job logs acquired by the first request coincides with the number of job logs which are acquisition targets of the first request, and the second request is made for acquiring the job logs one at a time which are acquisition targets of the first request if the number of job logs acquired by the first request is smaller than the number of job logs which are acquisition targets of the first request.

Further features of the present disclosure will become apparent from the following description of exemplary embodiments with reference to the attached drawings.

BRIEF DESCRIPTION OF THE DRAWINGS

FIG. 6 is a flowchart illustrating an example of a job log acquisition processing performed by the monitoring apparatus according to one or more aspects of the present disclosure.

DESCRIPTION OF THE EMBODIMENTS

Hereinafter, embodiments of the present disclosure will be described with reference to the drawings.

First Embodiment

System Configuration

Figure 1:
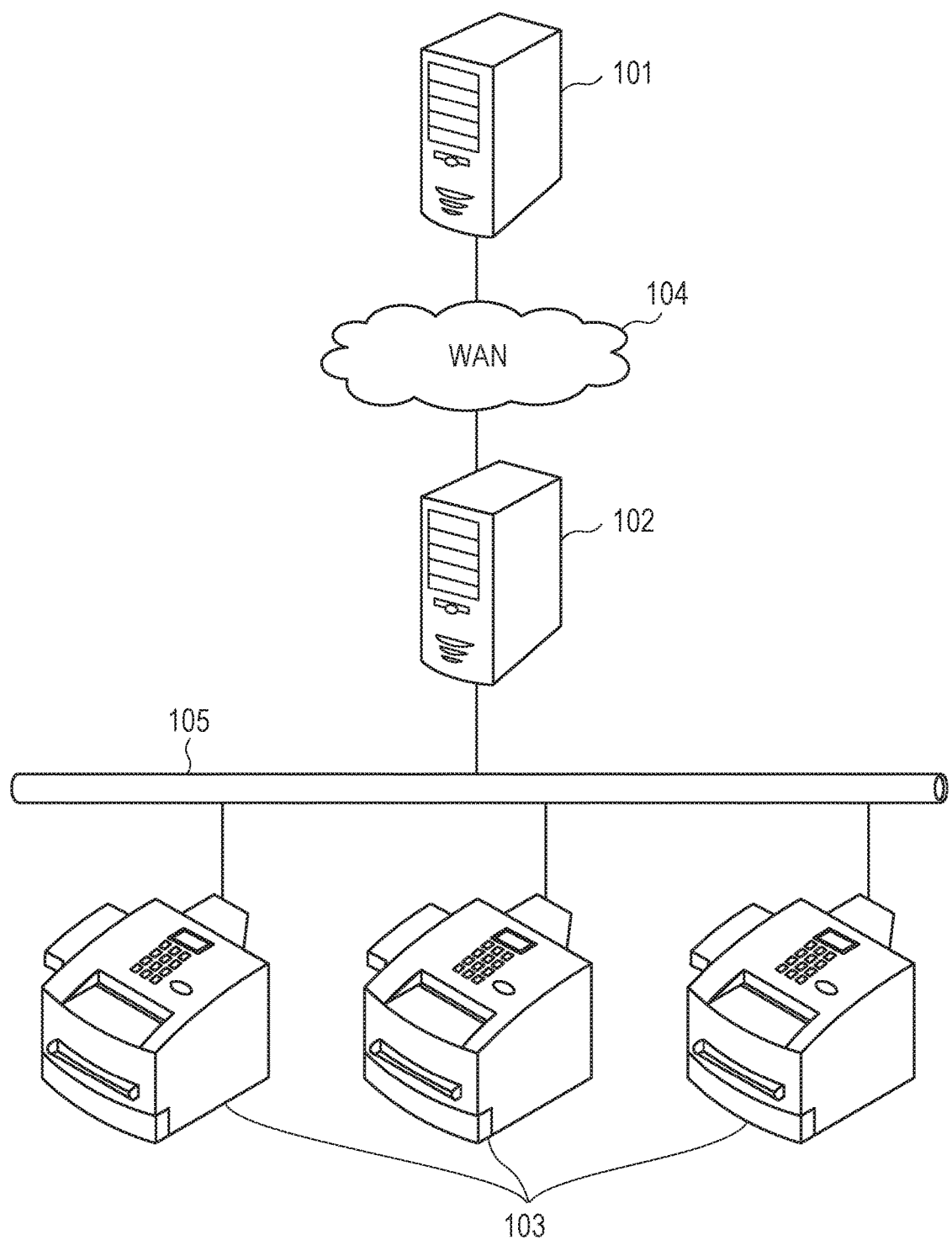
FIG. 1 illustrates an example of a system configuration according to one or more aspects of the present disclosure.

FIG. 1 illustrates an example of a system configuration according to an embodiment of the present disclosure. The system of the present embodiment is a system for managing image forming apparatuses, and consists of a monitoring apparatus which collects data from the image forming apparatuses and a management server which manages the data collected by the monitoring apparatus.

In FIG. 1, a management server 101 is connected to a monitoring apparatus 102 via a WAN 104, and centrally manages data in the monitoring apparatus 102 and image forming apparatuses 103. The monitoring apparatus 102 monitors the image forming apparatuses 103 via a LAN 105, and acquires various types of data from the image forming apparatuses 103. Examples of the acquired data may include job logs which are history information of jobs executed in the image forming apparatuses, for example. The image forming apparatuses 103 are a laser beam printer (LBP), a multifunctional peripheral (MFP), etc., which are monitored by the monitoring apparatus 102.

The management server 101 is connected to the monitoring apparatus 102 via the WAN 104, but may be connected via the LAN 105 instead. The image forming apparatuses 103 are connected to the monitoring apparatus 102 via the LAN 105 to communicate with the monitoring apparatus 102, but may be directly connected to the management server 101 via the LAN 105 or the WAN 104 instead. A management system in the present application at least includes the monitoring apparatus 102 and the image forming apparatus 103.

Hardware Configuration of Image Forming Apparatus

Figure 2:
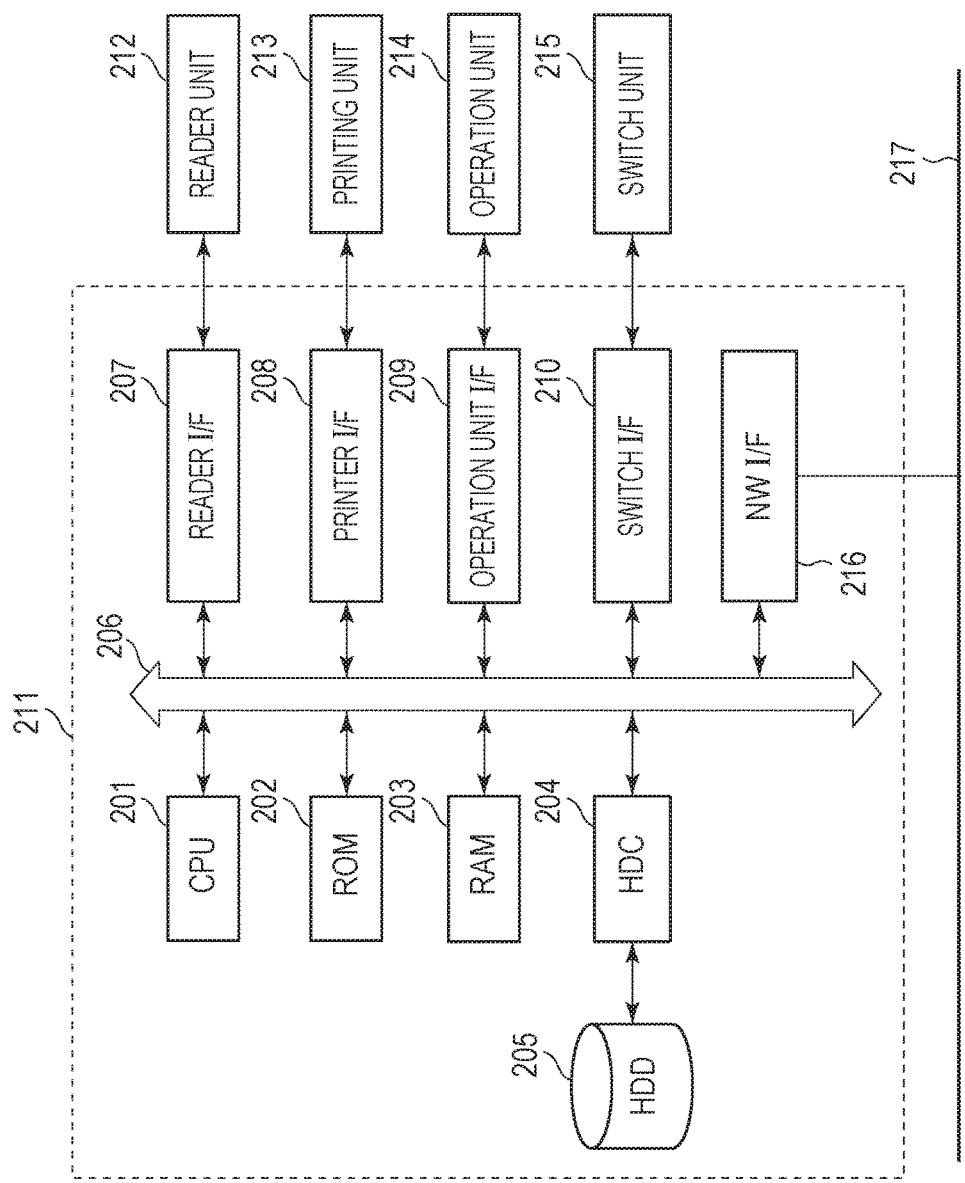
FIG. 2 illustrates an example of a hardware configuration of an image forming apparatus according to one or more aspects of the present disclosure.

FIG. 2 illustrates an example of a hardware configuration of the image forming apparatus 103.

A CPU 201 executes software which controls the entire image forming apparatus stored in ROM 202 or an HDD 205, and collectively controls devices connected to a system bus 206. The RAM 203 functions as a working area of the CPU 201, for example. A HDC 204 is a hard disk controller which controls the HDD 205.

A reader I/F 207 is connected to and controls a reader unit 212, and a printer I/F 208 is connected to and controls a printer unit 213. An operation unit I/F 209 is connected to an operation unit 214 and controls display on the operation unit 214 and user input from the operation unit 214. The operation unit 214 includes buttons for operation, a display unit, etc. A switch I/F 210 is connected to a switch unit 215 and controls operations from the switch unit 215. The switch unit 215 includes switches for operation, etc. A network interface card (NIC) 216 transmits data to and receives data from an external device, such as a host computer, via a network 217.

Here, in FIG. 2, a portion surrounded by a dotted line will be referred to as an entire control unit 211. The entire control unit 211 controls the devices connected to the image forming apparatus 103 and interfaces, and controls operations of the entire image forming apparatus 103. The reader unit 212 reads an image of a document, and outputs image data in accordance with the image of the document to the printer unit 213 or stores the image data in a storage apparatus 302 of the image forming apparatus 103 in response to user instructions. The image data may be transmitted to a host computer connected to the network 217 via the network I/F 216.

The printer unit 213 prints a document read by the reader unit 212 and the image data stored in the HDD 205 in a main body of the image forming apparatus 103. The printer unit 213 receives a print job from the host computer connected to the network 217 via the network I/F 216 and prints the print job. The network I/F 216 is connected via the network 217 and is used so that the entire control unit 211 communicates with other information devices on the network 217. The operation unit 214, consisting of buttons, a display device, a liquid crystal display screen with a touch panel, or combination thereof, displays information from the entire control unit 211 to the user and notifies the entire control unit 211 of user input. The switch unit 215 controls a power supply status (ON/OFF) of the entire control unit 211.

Here, depending on the memory capacity of the HDD 205 in the image forming apparatus 103, the number of storable job logs or storable data size is provided for each job type. When the memory capacity for storage becomes insufficient, the image forming apparatus 103 overwrites old job logs with new job logs.

Hardware Configuration of Management Server and Monitoring Apparatus

Figure 3:
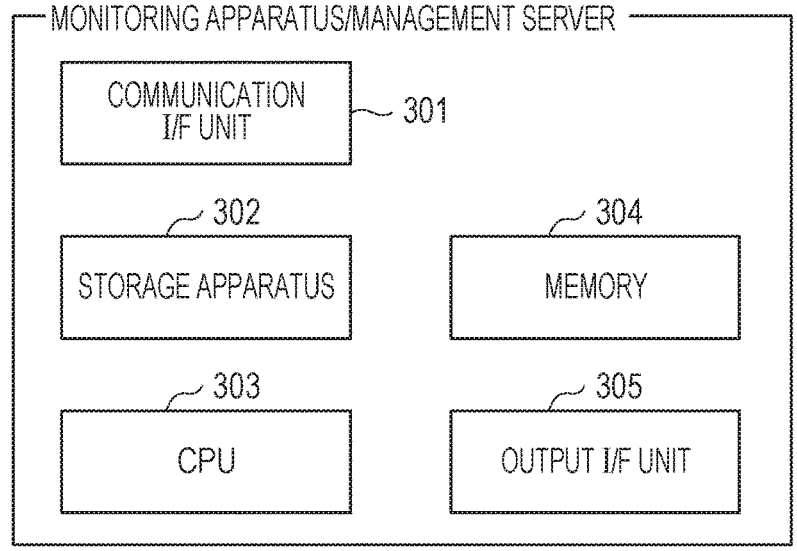
FIG. 3 illustrates an example of a hardware configuration of a monitoring apparatus and a management server according to one or more aspects of the present disclosure.

FIG. 3 illustrates an example of a hardware configuration of the management server 101 and the monitoring apparatus 102.

A communication I/F unit 301 is a network interface for performing communication with an external system and an external apparatus. A storage apparatus 302 stores an operating system (OS), a program, management data, data collected from an external system and an external apparatus, etc. A CPU 303 loads a program from the storage apparatus 302 to memory 304, and executes the loaded program. An output I/F unit 305 is connected to an output device, such as a display, and outputs an execution result of a program, etc.

Software Configuration of Image Forming Apparatus

Figure 4:
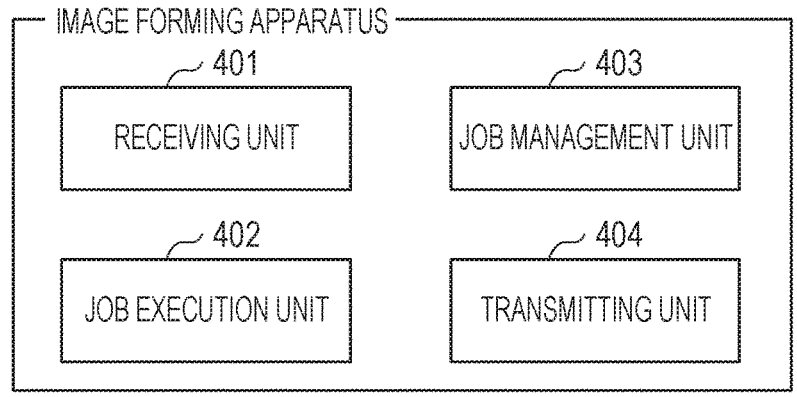
FIG. 4 illustrates an example of a software configuration of the image forming apparatus according to one or more aspects of the present disclosure.

FIG. 4 illustrates an example of a software configuration of the image forming apparatus 103.

A receiving unit 401 receives a request from an external device. For example, the receiving unit 401 receives a request for executing a print job, a request for acquiring job logs, etc. A job execution unit 402 executes a print job in response to a print job execution request received by the receiving unit 401.

A job management unit 403 stores and manages the executed job logs. For example, the job management unit 403 stores the job logs in the order in which the jobs are executed, and manages the job logs in association with information for identifying the job logs. Information for identifying the job logs will be described later. A transmitting unit 404 transmits a designated job log to an external device in response to a job log acquisition request received by the receiving unit 401.

Software Configuration of Monitoring Apparatus

Figure 5:
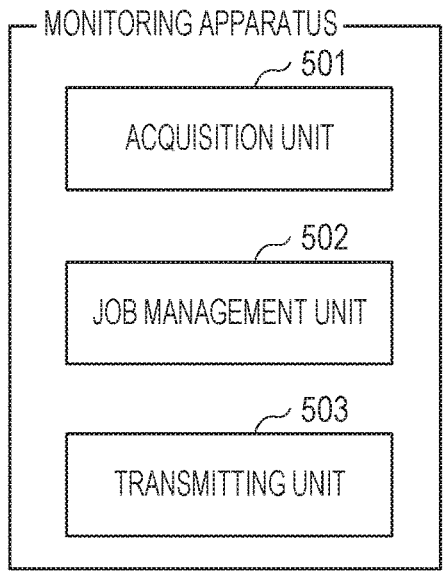
FIG. 5 illustrates an example of a software functional configuration of the monitoring apparatus according to one or more aspects of the present disclosure.

FIG. 5 illustrates an example of a software configuration of the monitoring apparatus 102.

An acquisition unit 501 transmits a request for acquiring job logs, and acquires job logs from the image forming apparatuses 103. A job management unit 502 stores and manages the acquired job logs. For example, the job management unit 502 manages identification information of the most recently acquired job log, identification information of the job executed most recently by the image forming apparatus 103, etc. A transmitting unit 503 transmits the acquired job logs etc., to the management server 101.

Here, when transmission processing of the job logs is executed in response to the job log acquisition request from the monitoring apparatus 102, a plurality of image forming apparatuses 103 illustrated in FIG. 1 return responses of the processing results in different manners. For example, with respect to a plurality of requested job logs, some image forming apparatuses return information indicating success of the processing ("OK") if at least one job log can be transmitted to the monitoring apparatus from the image forming apparatuses. Further, with respect to a plurality of requested job logs, some image forming apparatuses return information indicating partial success of the processing if at least one job log can be transmitted to the monitoring apparatus from the image forming apparatuses. Further, with respect to a plurality of requested job logs, other image forming apparatuses return information indicating a failure in the processing ("NG") if at least one job log cannot be transmitted. The image forming apparatuses which return "NG" if at least one job log cannot be transmitted return "OK" as a response of the processing result of request to the monitoring apparatus when all of the plurality of requested job logs are transmitted.

In the present disclosure, an acquisition status of the job log and whether recovery processing is required are determined by the job management unit 502 of the monitoring apparatus 102 in consideration of the difference in specifications of the image forming apparatuses without depending only on the responses of the processing result to the request. As the recovery processing, the monitoring apparatus 102 makes a re-request of job log information to the image forming apparatuses 103.

Job Log Acquisition Processing in Present Embodiment

FIG. 6 is a flowchart illustrating an example of a job log acquisition processing in the monitoring apparatus 102 of the present embodiment. The processing illustrated in the flowchart of FIG. 6 is performed by the monitoring apparatus 102. In particular, the processing of the flowchart of FIG. 6 is implemented when the CPU 303 reads and executes a program recorded in the storage apparatus 302.

Terms used in the description of the flowchart are as follows.

Write Pointer (WP)

WP refers to reference information for identifying the most recent job log among the job logs stored in the image forming apparatus 103. The reference information is held in the image forming apparatus 103. A WP value "1" is given to a job log stored in association with a job that is executed first in the image forming apparatus 103. Values incremented from the most recent WP value will be given to job logs stored in association with jobs executed thereafter.

Read Pointer (RP)

RP refers to reference information for identifying the most recent job log among the job logs acquired by the monitoring apparatus 102. The reference information is held in the storage apparatus 302 of the monitoring apparatus 102. In S624 described later, the monitoring apparatus 102 updates an RP value with the WP value of the job log held in the image forming apparatus 103.

Start Recode

Start Recode refers to the minimum value of the WP of one or more job logs which are acquisition targets of the request specified by the monitoring apparatus 102 as a request for acquiring job logs to be transmitted to the image forming apparatus 103.

Read Count

Read Count refers to the number of job logs which are acquisition targets of the request specified by the monitoring apparatus 102 as a request for acquiring job logs to be transmitted to the image forming apparatus 103. In the present embodiment, since the job logs are acquired one at a time in the request for reacquiring job logs described later, the Read Count value becomes 1 (the 2nd Read Count).

The flowchart will be described.

In S601, the acquisition unit 501 determines whether timing is right for job log acquisition. If it is determined that timing is right for job log acquisition, the processing advances to S602. In the image forming apparatus 103, timing (cycle) at which the monitoring apparatus 102 acquires job logs from the image forming apparatus 103 is determined so that job logs unacquired by the monitoring apparatus 102 are not overwritten with newly acquired job logs.

In S602, the acquisition unit 501 requests the image forming apparatus 103 to transmit the WP, and acquires the WP. The monitoring apparatus 102 holds the acquired WP value in the memory 304.

In S603, the job management unit 502 acquires the RP value held in the storage apparatus 302 of the monitoring apparatus 102, and holds the acquired RP value in the memory 304.

In S604, the job management unit 502 initializes the number of acquired job logs to "0."

In S605, the job management unit 502 determines whether a job log to be acquired exists in the image forming apparatus 103 under the following conditions. If "the number of acquired job logs<(WP-RP)," the job management unit 502 determines that a job log to be acquired exists, and the processing advances to S606. If not "the number of acquired job logs<(WP-RP)," the job management unit 502 determines that no job log to be acquired exists, and the processing advances to S621.

In S606, values of Start Recode and Read Count are obtained by the following Expressions.

Start Recode=RP+1+the number of acquired job logs

Read Count=WP−RP−the number of acquired job logs (or 30)

If the Read Count obtained by the Expression is greater than "30," the Read Count is defined as "30." This is because an upper limit of the number of job logs acquired for each request is determined. The upper limit of the number of job logs acquired for each request is determined to be "30" here in consideration of processing load, etc., of the monitoring apparatus 102 or the image forming apparatus 103, however, the upper limit may be other values.

In S607, the acquisition unit 501 transmits a request for acquiring job logs from the image forming apparatus 103. In the request for job log acquisition, the Start Recode and the Read Count obtained in S606 are designated as the request parameters. Job types may include printing, copying, facsimile, scanning, etc. Some image forming apparatuses 103 may manage the WP for each job type. In that case, a job type may be specified as a request parameter. The acquisition unit 501 may acquire the job logs from the image forming apparatus 103 as a response to the transmitted request.

In S608, the job management unit 502 checks whether a communication error is caused during acquisition of the job logs. If no communication error is caused, the processing advances to S609. If a communication error is caused, the processing is completed.

In S609, the job management unit 502 checks whether a result response from the image forming apparatus 103 is "OK." If the result response is "OK," the processing advances to S610. If the result response is other than "OK," the processing advances to S613.

In S610, the job management unit 502 compares the number of job logs actually acquired from the image forming apparatus 103 in response to the request in S607 with the Read Count (the number of job logs that were tried to be acquired) in order to check whether a predetermined condition is satisfied. If these numbers of job logs coincide, the processing advances to S611. If these numbers of job logs do not coincide (if the number of actually acquired job logs is smaller than the Read Count), the processing advances to S613.

In S611, the acquired one or more job logs are added to a job log list managed in the memory 304. If no job log list exists in the memory 304, a job log list is created here.

In S612, the job management unit 502 adds a Read Count to the number of acquired job logs. Then, the processing returns to S605.

In S613, the job management unit 502 initializes the 2nd number of acquired job logs prepared for reacquisition processing of the job log information to "0."

In S614, the job management unit 502 determines whether a job log which should be a reacquisition processing target exists in the image forming apparatus 103 under the following conditions. If "2nd number of acquired job logs <Read Count," the job management unit 502 determines that a job log which should be a reacquisition processing target exists, and the processing advances to S615. If not "2nd number of acquired job logs <Read Count," the job management unit 502 determines that no job log which should be a reacquisition processing target exists, and the processing advances to S612.

In S615, values of the 2nd Start Recode and the 2nd Read Count which are parameters of the request of the reacquisition processing are obtained by the following Expressions. Regarding the 2nd Read Count, since the job logs are acquired one at a time for each request, the value of the 2nd Read Count is fixed to "1."

2nd Start Recode=RP+1+2nd number of acquired job logs

2nd Read Count=1

In S616, the acquisition unit 501 transmits a request for acquiring job logs from the image forming apparatus 103 as reacquisition processing of job logs. Here, the acquisition unit 501 specifies the 2nd Start Recode and the 2nd Read Count obtained in S615 as the request parameters for the request for acquiring job logs. By reacquiring the job logs one at a time, whether a job log corresponding to each of the WP value exists can be checked.

In S617, the job management unit 502 checks whether a communication error is caused during acquisition of the job logs. If no communication error is caused, the processing advances to S618. If a communication error is caused, the processing is completed.

In S618, the job management unit 502 checks whether the result response from the image forming apparatus 103 is "OK." If the result response is "OK," the processing advances to S619. If the result response is other than "OK," the processing advances to S620.

In S619, the acquired one job log is added to the job log list managed in the memory 304. If no job log list exists in the memory 304, a job log list is created here.

In S620, the job management unit 502 adds a Read Count ("1") to the number of acquired job logs.

In S621, the job management unit 502 checks whether a job log exists in the job log list. If a job log exists, the processing advances to S622. It no job log exists, the processing is completed.

In S622, the job management unit 502 stores the job logs existing in the job log list in the storage apparatus 302.

In S623, the job management unit 502 deletes the job log list from the memory 304.

In S624, the job management unit 502 updates the RP value held in the storage apparatus 302 with the WP value held in the memory 304.

With the processing of the flowchart, the job log held in the storage apparatus 302 of the monitoring apparatus 102 will be transmitted to the management server 101 later.

Therefore, in cases where there is a difference between the number of job logs related to the request and the actually acquired number of job logs, the monitoring apparatus reacquires the job logs one at a time, whereby a failure in job log acquisition is avoided.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-144514 filed Jul. 22, 2016, which is hereby incorporated by reference herein in its entirety.

What is claimed is:

1. A monitoring apparatus capable of communicating with an image forming apparatus which stores job logs which are history information of jobs, the monitoring apparatus comprising:
a memory storing instructions; and
a processor executing the instructions causing the monitoring apparatus to:
calculate a number of job logs to be acquired from the image forming apparatus;
transmit, to the image forming apparatus, a first request to which the job logs to be acquired from the image forming apparatus are set as an acquisition target;
receive one or more job logs from the image forming apparatus in response to the first request;
store, if a number of the job logs received in response to the first request coincides with the number of the job logs as the acquisition target, the received job logs in a storage;
transmit, to the image forming apparatus, a second request for acquiring, one at a time, the job logs as the acquisition target, if a number of the one or more job logs received in response to the first request is smaller than the number of the job logs as the acquisition target, wherein the second request is repeatedly transmitted up to the number of the job logs as the acquisition target, each time a response is received from the image forming apparatus; and
store one or more job logs in the storage received from the image forming apparatus in response to the second requests.

2. The monitoring apparatus according to claim 1,
wherein the job logs are stored in the image forming apparatus in the order in which jobs are executed,
wherein the instructions further cause the monitoring apparatus to:
make an inquiry to the image forming apparatus about first reference information for identifying the most recent job log among job logs stored in the image forming apparatus, and
manage second reference information for identifying the most recent job log among the job logs acquired by the first request and the second request, and wherein the number of job logs to be acquired from the image forming apparatus is calculated by using the first reference information and the second reference information.

3. The monitoring apparatus according to claim 1, wherein the monitoring apparatus is capable of communicating with a management server which manages information about the image forming apparatus, and wherein the instructions further cause the monitoring apparatus to transmit the job logs stored in the storage to the management server.

4. The monitoring apparatus according to claim 1, wherein, if a communication error with the image forming apparatus is caused after the first request or the second request is transmitted, a further second request is not transmitted to the image forming apparatus.

5. A control method for a monitoring apparatus capable of communicating with an image forming apparatus which stores job logs which are history information of jobs, the control method comprising:

calculating a number of job logs to be acquired from the image forming apparatus;

transmitting, to the image forming apparatus, a first request to which the job logs to be acquired from the image forming apparatus are set as an acquisition target;

receiving one or more job logs from the image forming apparatus in response to the first request;

storing, if a number of the job logs received in response to the first request coincides with the number of the job logs as the acquisition target, the received job logs in a storage;

transmitting, to the image forming apparatus, a second request for acquiring, one at a time, the job logs as the acquisition target, if a number of the one or more job logs received in response to the first request is smaller than the number of the job logs as the acquisition target, wherein the second request is repeatedly transmitted up to the number of the job logs as the acquisition target, each time a response is received from the image forming apparatus; and storing one or more job logs in the storage received from the image forming apparatus in response to the second requests.

6. The control method according to claim 5, wherein the job logs are stored in the image forming apparatus in the order in which jobs are executed, wherein the instructions further cause the monitoring apparatus to:

make an inquiry to the image forming apparatus about first reference information for identifying the most recent job log among job logs stored in the image forming apparatus, and manage second reference information for identifying the most recent job log among the job logs acquired by the first request and the second request, and wherein the number of job logs to be acquired from the image forming apparatus is calculated by using the first reference information and the second reference information.

7. The control method according to claim 5, wherein the monitoring apparatus is capable of communicating with a management server which manages information about the image forming apparatus, and wherein the instructions further cause the monitoring apparatus to transmit the job logs stored in the storage to the management server.

8. The control method according to claim 5,

Wherein, if a communication error with the image forming apparatus is caused after the first request or the second request is transmitted, a further second request is not transmitted to the image forming apparatus.

9. A non-transitory computer readable storage medium on which is stored a computer program for making a computer execute a control method for a monitoring apparatus capable of communicating with an image forming apparatus which stores job logs which are history information of jobs, the control method comprising:

calculating a number of job logs to be acquired from the image forming apparatus;

transmitting, to the image forming apparatus, a first request to which the job logs to be acquired from the image forming apparatus are set as an acquisition target;

receiving one or more job logs from the image forming apparatus in response to the first request;

storing, if a number of the job logs received in response to the first request coincides with the number of the job logs as the acquisition target, the received job logs in a storage;

transmitting, to the image forming apparatus, a second request for acquiring, one at a time, the job logs as the acquisition target, if a number of the one or more job logs received in response to the first request is smaller than the number of the job logs as the acquisition target, wherein the second request is repeatedly transmitted up to the number of the job logs as the acquisition target, each time a response is received from the image forming apparatus; and storing one or more job logs in the storage received from the image forming apparatus in response to the second requests.

* * * * *